United States Patent [19]
Gallagher et al.

[11] 3,754,568
[45] Aug. 28, 1973

[54] CHECK VALVE

[75] Inventors: Bernard J. Gallagher; Earl D. Shufflebarger, both of Mentor; David M. Simko, Parma Heights; Richard J. Medvick, Cleveland, all of Ohio

[73] Assignee: Nupro Company, Cleveland, Ohio

[22] Filed: Oct. 14, 1971

[21] Appl. No.: 189,208

[52] U.S. Cl........ 137/516.29, 137/541, 137/541.21, 267/175
[51] Int. Cl. ........................................... F16k 15/02
[58] Field of Search................. 137/516.25, 516.27, 137/516.29, 540, 543.19, 543.21, 543.17; 151/20; 251/149.6, 321; 267/175, 177

[56] References Cited
UNITED STATES PATENTS

| | | | |
|---|---|---|---|
| 2,021,771 | 11/1935 | Farmer .......................... | 137/540 X |
| 2,940,472 | 6/1960 | Chilcoat........................... | 137/540 |
| 992,137 | 5/1911 | Nowak.............................. | 151/20 |
| 1,832,060 | 11/1931 | Strid ................................ | 151/20 |
| 1,360,960 | 11/1920 | Kudla............................... | 137/516.25 |
| 2,745,432 | 5/1956 | Williams........................... | 137/540 |
| 2,859,031 | 11/1958 | Hansen et al................. | 137/543.21 X |
| 2,959,188 | 11/1960 | Kepner ............................ | 137/540 |
| 3,189,046 | 6/1965 | Callahan et al.................. | 137/540 X |
| 3,255,774 | 6/1966 | Gallagher et al. ............... | 137/516.29 |

FOREIGN PATENTS OR APPLICATIONS

| | | | |
|---|---|---|---|
| 2,532 | 1898 | Great Britain..................... | 137/540 |
| 731,028 | 6/1955 | Great Britain..................... | 137/540 |

Primary Examiner—William R. Cline
Attorney—Fay, Sharpe & Mulholland

[57] ABSTRACT

The specification and drawings disclose poppet-type check valves each comprising a body with a through flow passage and a valve member with a generally circular sealing surface positioned within the passage. The valve member is continually biased toward a seat by a coil spring mounted in the passage. An O-ring positioned in a circumferential groove formed about the passage defines the seat. The groove is open only about the axial side facing the valve member. The inner circumference of the groove is of a lesser diameter than the sealing surface of the valve member. The O-ring is positioned within the groove and has a radial thickness sufficiently greater than the radial width of the groove such that when compressed in the groove, a portion extends out of the open side for engagement with the end face of the valve member. The radially inner wall of the groove is provided with a continuous edge surface which is adapted to engage the end face of the valve member to provide a fixed stop for the valve member. Means for varying the compression on the spring are provided and includes two members threaded axially in the passageway. Each of the members is shown as having a non-circular flow passageway formed through its center. The passageways align in certain positions of relative rotation for adjustment purposes. Thus, adjustment can be accomplished by insertion of an adjusting tool into the flow passage and no external adjustment members are required.

12 Claims, 11 Drawing Figures

3,754,568

BERNARD J. GALLAGHER
EARL D. SHUFFLEBARGER
DAVID M. SIMKO
RICHARD J. MEDVICK
INVENTORS

BY
Fay, Sharpe & Mulholland
ATTORNEYS

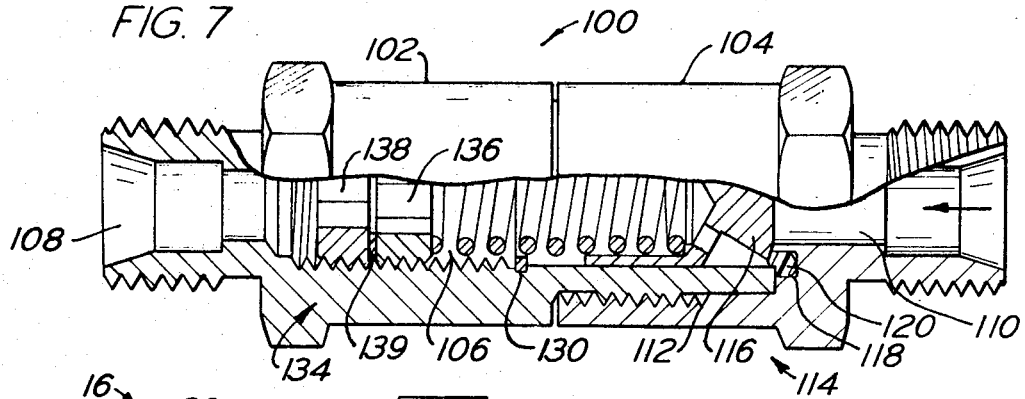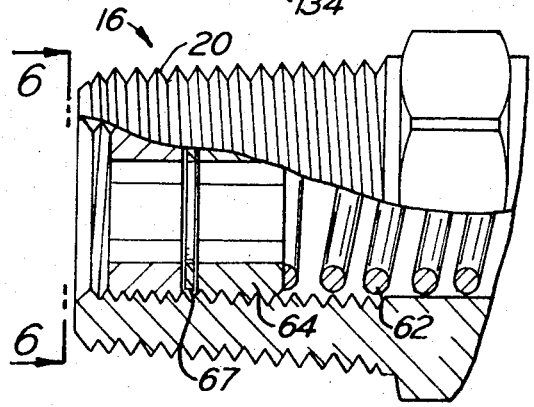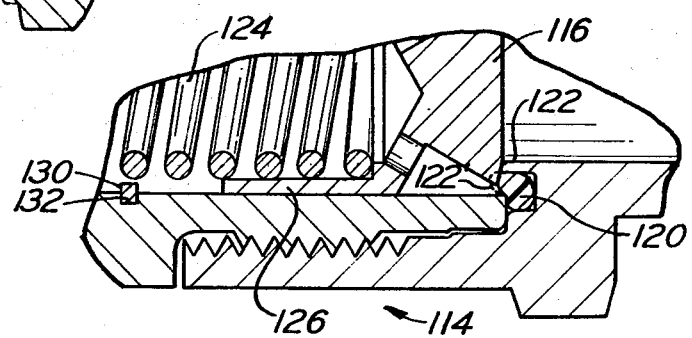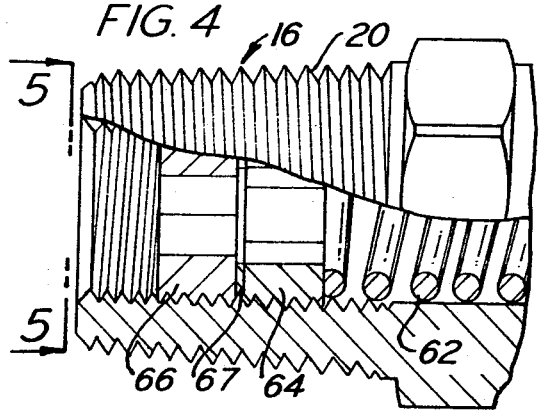

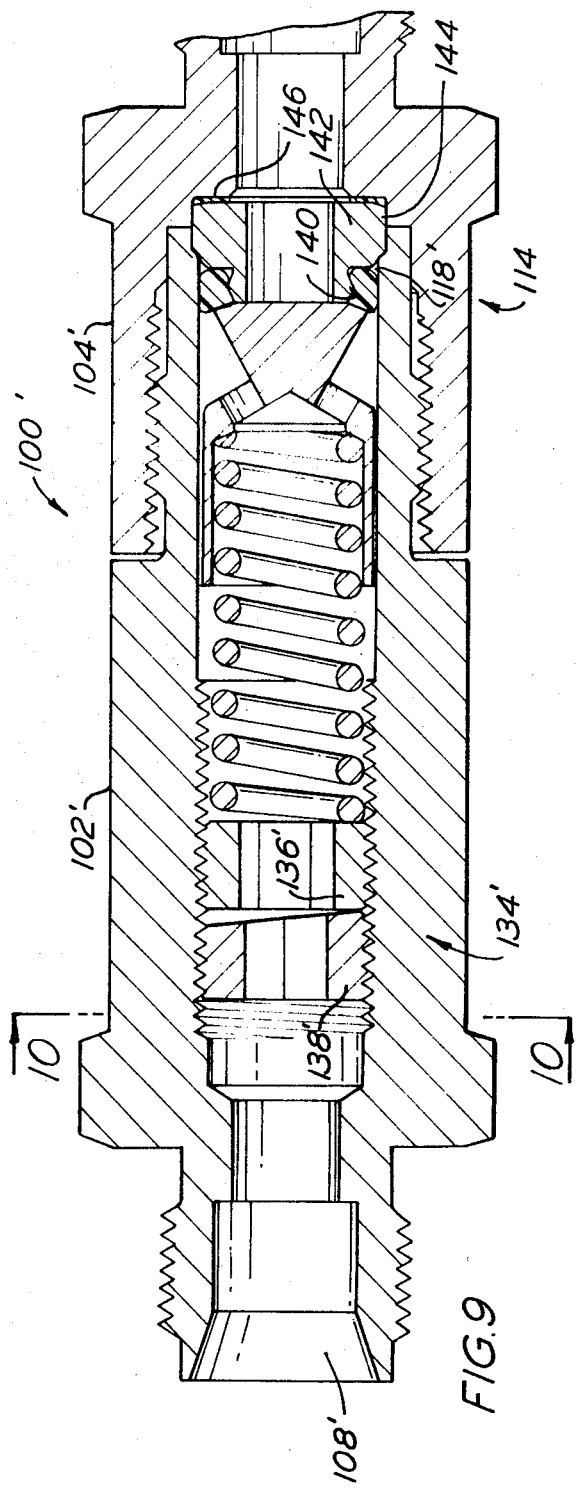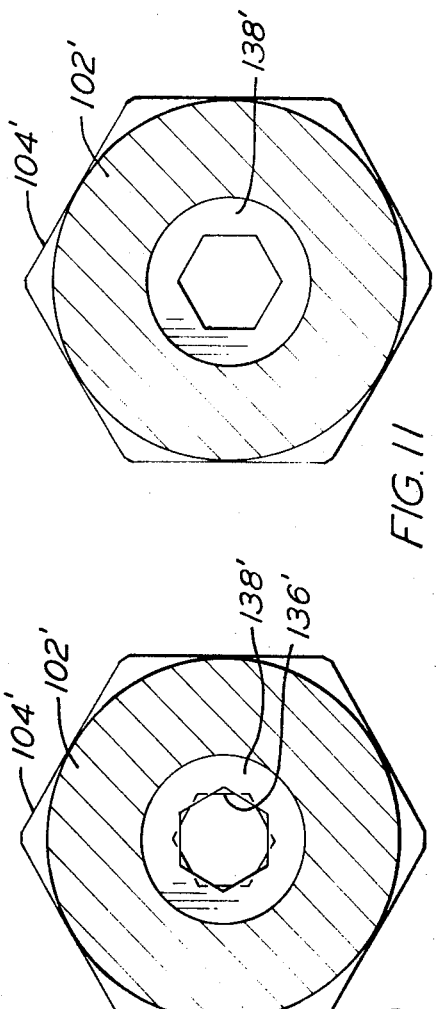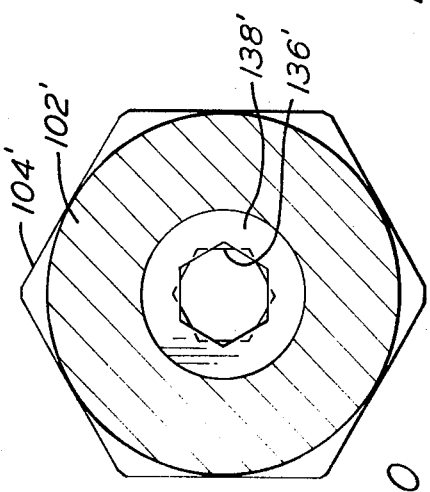

CHECK VALVE

The present invention is directed toward the valve art and, more particularly, to an improved check valve.

The invention is primarily concerned with the provision of a relatively small, check valve having an improved seating and adjustment arrangement.

Most prior poppet-type check valves have certain disadvantages particularly with regard to the poppet seat. For example, the seat has often comprised a resilient O-ring or sleeve like member positioned in a radial groove between mating body halves. One of the problems with this arrangement has been the difficulty of properly holding the seat in position. At times, line pressure can get behind the seat member and cause it to "blow-out." Additionally, under high back pressures, the poppet can be driven into the resilient seat, damaging the seat or otherwise injuring the valve.

A further problem with the prior poppet-type check valves has been that when subjected to high and sudden pressure surges, the compression or control spring could be over stressed and damaged. Moreover, under certain conditions, some of the prior compression spring arrangements could cause the poppet to jam in the open position.

Another difficulty with prior valves of the type under consideration was that they could not be readily adjusted for different pressure settings. Many could only be adjusted by changing springs. Others, although designed to permit the compression on the spring to be varied, were extremely difficult to adjust. Often, special tools or substantial disassembly of the valve was required. Even then, it was very hard to change the compression on the spring and lock the adjusting mechanism at the desired position.

The subject invention seeks to overcome the above-discussed problems by the provision of a poppet-type check valve having a body with a through flow passage and a valve member having a generally circular sealing surface is positioned within the passage and continually biased toward a seat. According to one aspect of the invention, the seat is defined by an O-ring positioned in a circumferential groove formed about the passage. The groove is open only about the axial side facing the valve member. The inner circumference of the groove is of a lesser diameter than the sealing surface of the valve member. The O-ring is positioned within the groove and has a radial thickness sufficiently greater than the radial width of the groove such that when compressed in the groove, a portion extends out of the open side for engagement with the end face of the valve member. The radially inner wall of the groove is also preferably provided with a continuous edge surface which is adapted to engage the end face of the valve member to provide a fixed stop. By controlling the size of the groove and the O-ring, the total sealing pressure between the O-ring and the valve member is controlled.

The invention also contemplates that the O-ring receiving groove will have a continuous radially extending lip about its inner wall to provide a band of high contact pressure between the O-ring and the groove. This helps retain the O-ring in the groove and prevents fluid pressure from getting behind the O-ring.

Another aspect of the invention contemplates that biasing means will comprise a coil spring positioned within the passage between the valve member and an adjustable stop. The adjustable stop includes at least two members threaded axially in the passageway. The innermost serves as the top and the outermost serves to lock the stop in its adjusted position. Each of the members has a flow passageway formed through its center. The members include tool receiving portions and align in certain positions of relative rotation. For example, in the preferred embodiment, the passageways are hex shaped. Consequently, to adjust the position of the stop, an Allen wrench is inserted into the passageway until it engages the hex shaped passageway in the lock member. The lock member can then be rotated to release it from its lock position and align its passageway with the passageway in the stop member. The wrench can then be inserted further in to engage the stop member. Thereafter, the stop member can be rotated simultaneously with the lock member to move it to a new position of adjustment. Subsequently, the above procedure is reversed to lock the stop member in position.

The described compression spring adjustment is both simple and reliable. As is apparent, the adjustment members do not extend externally of the valve body and disassembly of the valve is not required to effect the adjustment. Further, in the preferred embodiment, no special tools are required for making the adjustment.

Accordingly, one primary object of the invention is the provision of a relatively simple, compact check valve which is easy to adjust.

Another object is the provision of a check valve of the general type described wherein the seat includes an O-ring type seal which, in addition to serving as a seat member, seals mating body sections.

A still further object is the provision of a check valve of the general type described wherein the movement of the valve member is limited between fixed stops and guided throughout its movement.

An additional object is the provision of a check valve of the general type described which can be adjusted to different pressure settings without special tools or disassembly.

The above and other objects and advantages will become apparent from the following description when read in conjunction with the accompanying drawings wherein:

FIGS. 3 and 4 are partial cross-sectional views of the left-hand end of the valve of FIG. 1 showing the adjustable stop mechanism;

Figure 1:
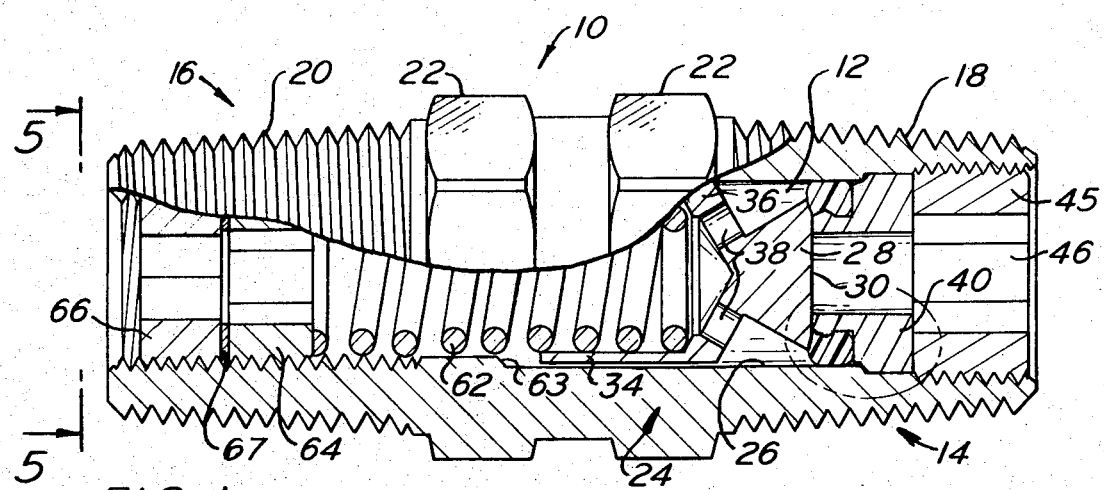
FIG. 1 is a side view partially in cross-section of a check valve formed in accordance with the preferred embodiment of the invention.
Figure 5:
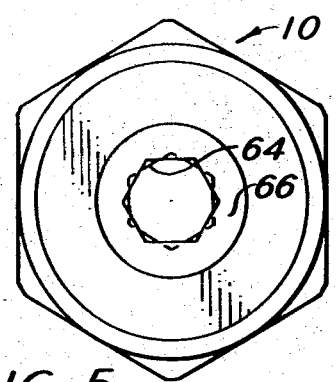
Figure 6:
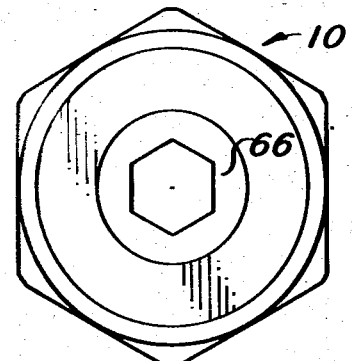

FIGS. 5 and 6 are end views taken on lines 5—5 and 6—6 of FIGS. 1 and 3 respectively;

FIG. 7 is a side view partially in cross-section showing a modified form of the invention;

FIG. 8 is an enlarged cross-sectional view of the poppet and valve seat of the valve of FIG. 7;

FIG. 9 is a longitudinal cross-sectional view through a modified form of the FIG. 7 embodiment;

FIG. 10 is a view taken on line 10—10 of FIG. 9 showing the left end of the FIG. 9 valve; and, FIG. 11 is a view of the left end of the valve of FIG. 7 but showing the stop and adjustment members in position for adjustment of the spring compression.

Referring more particularly to FIG. 1, the preferred embodiment of the invention is shown as comprising a one-piece body 10 having an axially extending flow passage 12 in which is carried the valve and seat assembly 14 and the setting adjustment assembly 16.

In the embodiment under consideration, the body 10 is, as previously mentioned, a one-piece body formed from any suitable material and has the general circular flow passage 12 formed axially therethrough. The body is shown as having pipe threads 18 and 20 formed on opposite ends so that the valve may be readily connected into standard piping systems. Other types of connecting arrangements, such as flanges, swage fitting, or the like, could obviously be used instead of the threaded ends shown. Preferably, the center section of the body 10 is provided with wrench flats 22 to assist in installation or removal of the valve.

One aspect of the subject invention which is relatively important is the relationship between the valve member and the seat assembly. As shown, the assembly comprises a poppet type valve member 24 which is slidably mounted in section 26 of the passage 12. The valving portion of the member 24 includes a somewhat conically shaped end 28 having a generally flat face 30 and an inclined peripheral edge portion 32. A cylindrical, tubular portion 34 is joined to portion 28 by a continuous, inclined end wall 36. A plurality of openings 38 are formed through the end wall 36 in the manner shown. It should be noted that the openings 38 are preferably inclined at an angle generally corresponding to the taper on the conical end portion 28 so that a relatively smooth flow path is provided through the member and about the end portion.

Figure 2:
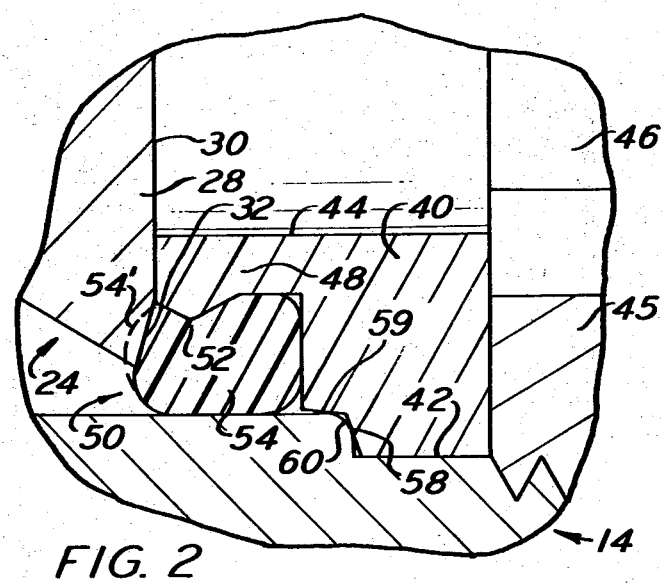
FIG. 2 is an enlarged cross-sectional view of the circled area of FIG. 1.

The seat assembly for the valve member 24 is, in the preferred embodiment, releasably carried in the right-hand end of the valve and incudes a seat retainer member 40. Member 40 is, as best shown in FIG. 2, slidably received in a counterbore 42 formed in passageway 12. A through passage 44 is formed through the retainer 40 and has a diameter substantially less than the maximum diameter of end portion 28 of the valve member 24. The retainer member 40 is locked in position in the body by a lock member 45 threadedly received in the outer end of the passageway 12. The lock member 45 has a center passageway 46 which is preferably of non-circular shape so that a wrench or other tool can be inserted into the passageway for removal of the lock member. In the embodiment shown, passageway 46 is hex shaped so that a standard hex wrench can be used for this purpose.

The retainer member 40 includes an axially extending flange portion 48 which, in combination with the inner surface of the wall of passageway 12 defines an annular, axially open recess 50. A protuberance or lip 52 extends radially outward from the surface of flange portion 48. It will be seen that the flange portion 48, lip 52, and the inner wall of passageway portion 26 confine a resilient O-ring throughout an extent of greater than 180 degrees of its cross-sectional circumference. The O-ring is sized so that in the uncompressed state, its internal diameter is substantially less than the diameter across the retainer over the lip 52. Additionally, its outer diameter is preferably greater than the internal diameter of the passage portion 26. Thus, when compressed in the recess 50, it will normally extend axially out of the recess as illustrated by the dotted line 54'. Thus, the plug member 24 sealingly engages the O-ring when it is in the closed position shown. The total compressive load that can be applied to the O-ring seat is, of course, limited by the flange 48.

Because of the manner in which the O-ring is confined, fluid from passageway 12 cannot get behind it and move it out of the recess. Additionally, it should be noted that the retainer 40 has inclined end faces 58 and 59 which engage a rounded shoulder portion 60. When the lock member 45 is tightened, the faces 58 and 59 and the shoulder 60 provide metal-to-metal seals to prevent entrance of fluid from the inlet side of the valve member.

In the embodiment under consideration, the valve member 24 is continually biased toward the seat by a coil spring 62. The spring preferably has an outer diameter such that it is closely received within the tubular portion 34 of the valve member. The opposite end bears against the adjustable stop assembly 16. It should be noted that a shoulder 63 is formed within the passageway 12. The shoulder acts as a stop for the valve member and limits the extent of opening.

Although the adjustable stop assembly 16 could take many forms within the scope of the invention, in the subject embodiment, it comprises a first movable stop member 64 and a lock member 66 which are threadedly received in the left-hand end of the body 10. As shown, the passageway 12 is provided with internal threads 68 which receive the stop member 64 and the lock member 66 and permit them to be shifted longitudinally in the passageway. Both the adjustable stop member 64 and the lock member 66 have axial passageways which provide a flow path through the stop assembly. As will hereafter become apparent, the axial passageways through these members could have many different configurations. However, in the embodiment shown, the passageways are hex shaped and of the same size. Thus, the stop member 64 can be threaded into the body to a desired position by the use of a standard hex wrench. Thereafter, the lock member can be threaded in to lock the stop member in the desired position. When assembled, the stop member and lock member will normally not have their hex passages in alignment. For example, see FIG. 5, which illustrates the stop and lock members in a lock position with the hex portions out of alignment. To adjust the setting of the adjustable stop member 64 after assembly, a hex wrench is inserted into member 66 and the member loosened only slightly to bring the two hex openings into alignment as shown in FIGS. 6 and 3. This releases the lock member from the adjustable stop member and as soon as the hex portions are in alignment, the wrench can be inserted further in to engage with the adjustable stop member 64. Thereafter, rotation of both members can take place simultaneously to adjust the location of the stop member and the compression on spring 62. FIG. 4 shows the stop member and the lock member adjusted to a new position. Their spacing is, of course, maintained uniformly throughout adjustment and when the desired position of adjustment is reached, the wrench is withdrawn to a position where it engages only the lock member 66. The lock member can then be tightened to hold the stop member in the desired position. The entire adjustment can thus take place without removal of any components and without the use of special tools. It should be understood that although the two passageways through the lock and adjustment members have been described and illustrated as hex shaped, they could have substantially any desired non-circular shape. Further, although they have been illustrated as of uniform size, they could be of different size. Further, tool receiving slots, openings or the like could be provided for alignment only in certain positions of relative rotation. This would allow use of circular openings through the members but would normally require a special tool or additional machining operations and is less desirable.

Although the members 64 and 66 can, in many instances, be in direct engagement, some combinations of materials for the body and adjustment member result in low friction between the body and adjustment member. Consequently, under some conditions, final tightening of the lock member can rotate the adjustment member slightly to move it out of position. For this reason, it is preferable to reduce frictional contact between the adjustment and lock members. For example, in the subject embodiment, a washer 67 is placed between members 64 and 66. The washer 67 serves as a bearing to eliminate the possibility of moving member 68 during tightening. As will subsequently become apparent, other types of bearing means, low friction surfaces or the like could equally well be used.

To change compression springs, the lock member and the adjustable stop member can be rapidly removed allowing the compression spring member to be moved through the left-hand end of the passageway 12. Similarly, the valve member can be removed merely by removing the lock member 45 and the retainer 40 together with the O-ring 54.

FIGS. 7 and 8 illustrate a modified form of the invention which incorporates the same main features described with reference to the FIGS. 1 through 6 embodiment. In general, the FIGS. 7 and 8 embodiment differs in that it comprises a two-piece housing 100 including a first male body section 102 which is threadedly received in a female body section 104. The male body section 102 has a central flow passage 106 which extends axially therethrough. The left end of passage 106 is provided with an opening 108 of the type used for swage connectors. The female body section 104 is similarly provided with a through passage 110 and a threaded counterbored section 112 which receives the male portion of body section 102.

The valve and seat assembly 114 is formed generally similar to that described with reference to the FIGS. 1 through 6 embodiment. In particular, it comprises a valve member 116 which is identical in shape to valve member 24 of the first embodiment. The primary difference in the valve and seat assembly of FIGS. 7 and 8 embodiment lies in the retaining arrangement for the O-ring seat member. As shown, an axially extending circumferential recess 118 is formed in the end wall of the counterbore 112. An O-ring 120 is positioned within the recess. As best shown in FIG. 8, the O-ring is sized so that it is compressed within the groove and has a portion which extends outwardly beyond the inner wall 122 of the recess. Note that when the plug member 116 is in the open position, the recess extends outwardly to the dotted line position identified by the numeral 122'.

The inner end of the male stem portion of body section 102 is arranged to engage the O-ring and compress a portion of it upon tightening of the two body sections. Thus, in this embodiment, the O-ring is engaged throughout an extent of greater than 180 degrees and is prevented from blowing out. Moreover, the inner wall 122 of the recess serves as a fixed stop so that the sealing pressure applied to the O-ring is limited and the valve member prevented from extending into the seat upon occurance of a high back pressure.

The valve member 116 is maintained under a continual bias toward the seat by a compression spring 124 which is received within the circular collar 126 of the valve member. The valve member 116 is limited in the extent of its opening by a snap ring 130 received in a groove 132 carried within the body section 102. Thus, the valve member 116 is provided with positive stops at both the open and closed positions.

In the FIGS. 7 and 8 embodiment, the adjustable stop assembly 134 is comprised of a stop member 136 and a lock member 138. These members are identical to the members 64 and 66 of the FIGS. 1 through 6 embodiment. A washer 139 is positioned between members 136 and 138 to eliminate inadvertant movement of adjusting member 138 during tightening of the lock member 136. Adjustment of this embodiment is accomplished in the same manner as described with reference to the FIG. 1 embodiment. It is important to note, however, that the members 136 and 138 are inserted from the right-hand end of the passageway 106. For this reason, the maximum outer diameter over the apex of their threads must be less than the minimum diameter of the unthreaded, right end portion of the passageway 106.

The FIGS 9 through 11 embodiment is generally the same as the embodiment shown in FIGS. 7 and 8. Accordingly, the same reference numerals differentiated by the addition of a prime (') suffix have been used to identify the same elements. The description of a FIG. 7 element is to be taken as equally applicable to the corresponding element of FIGS. 9 through 11 embodiment unless otherwise noted. The primary differences between the two embodiments reside in the arrangement of the seat and adjustment members. In the FIGS. 9 through 11 embodiment, the seat is formed by a resilient O-ring member 140 carried by an insert 142. As shown, the insert 142 includes a radially extending body or flange 144 which is sealingly clamped between the female body section 104' and the inner end of the male body section 102'. Preferably, a resilient annular washer or ring 146 is positioned between the insert member 142 and the female body 104'. The insert 142 is, in all particulars, basically identical to the insert 44 described with reference to the FIGS. 1 through 6 embodiment. Additionally, its size relationship to the O-ring 140 is also the same as discussed with reference to the FIGS. 1 through 6 embodiment.

The other primary difference between the FIGS. 9 through 11 embodiment and the FIGS. 7 and 8 embodiment is in the arrangement of the adjusting and lock members. In the FIGS. 9 through 11 embodiment, the lock member 138' is arranged so that it makes only point or line contact with the adjusting member 136'. Note that this is accomplished by grinding a taper on one face of lock member 138'. That is, the lock member and the adjusting member are arranged so that their opposed faces are non-parallel. It has been found that this prevents transmission of torque from the lock member to the adjusting member. Obviously, other arrangements could be used. For example, small protuberances or the like could be formed on one of the other of the opposed faces; the important consideration being the elimination of high frictional engagement between the opposed faces. Otherwise, tightening of the lock could cause changes in the setting pressure.

The invention has been described in great detail sufficient to enable one of ordinary skill in the valve art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A valve comprising:
a valve body including a valve chamber and flow inlet and outlet passages connecting said chamber to inlet and outlet openings;
a seat in said chamber, a valve member continuously biased toward said seat by spring means; and,
adjustment means for varying the force with which said spring means biases said valve member, said adjustment means including an adjustment member in engagement with said spring means and threaded in said outlet flow passage, a lock member threaded in said outlet flow passage for locking said adjustment member in desired positions, said adjustment member and said lock member having axially aligned flow openings of substantially equal size and non-circular configuration extending therethrough with each said flow opening being accessible from said outlet opening and the non-circular configuration of said flow openings providing means for receiving a tool in said adjustment member and said lock member whereby adjustment of said valve can be made through said outlet opening without disassembly of said valve.

2. The valve as defined in claim 1 wherein said lock member and said adjustment member have external threads which mate with internal threads formed in said outlet flow passage.

3. The valve as defined in claim 1 wherein said spring means comprises a coil spring positioned between said valve member and said adjustment member.

4. The valve as defined in claim 3 wherein said lock member and said adjustment member are on the side of said valve member opposite said seat.

5. The valve as defined in claim 3 wherein said coil spring and said valve member are axially aligned with said valve seat.

6. The valve as defined in claim 3 wherein said outlet passage is axially aligned with said valve chamber and said seat.

7. The valve as defined in claim 1 wherein said outlet passage is aligned with said seat.

8. The valve as defined in claim 1 wherein said means for receiving a tool comprise flats formed in said flow openings.

9. The valve as defined in claim 1 wherein said adjustment member and said lock member have non-parallel faces which engage over a limited area when said lock member is in a lock position.

10. A valve comprising:
a housing having a passage therethrough;
a valve seat means spaced inwardly from a first end of said passage;
a shoulder spaced inwardly from a second end of said passage;
a valve member slidably mounted in said passage between said shoulder and said seat means, said valve member including an end face having an inclined peripheral edge adapted to sealingly engage said seat means and a tubular end extending toward said shoulder and adapted to engage said shoulder upon predetermined movement away from said seat, spring means mounted in said passages for maintaining said valve member continuously biased toward said seat means;
said seat means including an axially open, circumferential recess facing said end face with and O-ring positioned therein and extending axially outwardly, said recess being defined by the wall of said passage and an insert member slidably received in said first end of said passage, said insert including a center bore and an axially extending flange portion which defines the radially inner wall of said recess and terminates in an end, the end of said flange portion having a circumferential lip extending toward the wall of said passage to restrict the axially open end of said recess and tightly enclose said O-ring throughout an extent of greater than 180 degrees of its cross-section to compress said O-ring and cause a portion thereof to extend axially out of said recess for sealingly engaging said peripheral edge, the end of said flange adapted to engage said end face to limit the compression applied to said O-ring by said valve member;
thread means on said first end for releasably retaining said insert therein; and,
cooperating surfaces on said insert and said wall of said passage between said recess and said lock means for limiting axially inward movement of said insert and providing a fluid seal between said insert and said wall of said passage.

11. The valve as defined in claim 10 including adjusting means for varying the compression on said spring means, said adjusting means being accessible from the second end of said passage.

12. The valve as defined in claim 11 wherein said adjusting means includes a member threaded in the second end of said passage and engaging said spring means.

* * * * *

UNITED STATES PATENT OFFICE
CERTIFICATE OF CORRECTION

Patent No. 3,754,568      Dated August 28, 1973

Inventor(s) Bernard J. Gallagher et al.

It is certified that error appears in the above-identified patent and that said Letters Patent are hereby corrected as shown below:

Column 2, line 2, change "top" to -- stop --.

Column 3, line 6, change "general" to -- generally --.

Column 3, line 34, change "incudes" to -- includes --.

Column 3, line 57, insert -- 54 -- after "O-ring".

Column 4, line 27, cancel "68".

Column 6, line 47, change "44" to -- 40 --.

Column 8, line 22, change "and" to -- an --.

Signed and sealed this 19th day of March 1974.

(SEAL)
Attest:

EDWARD M. FLETCHER, JR.
Attesting Officer

C. MARSHALL DANN
Commissioner of Patents